UNITED STATES PATENT OFFICE.

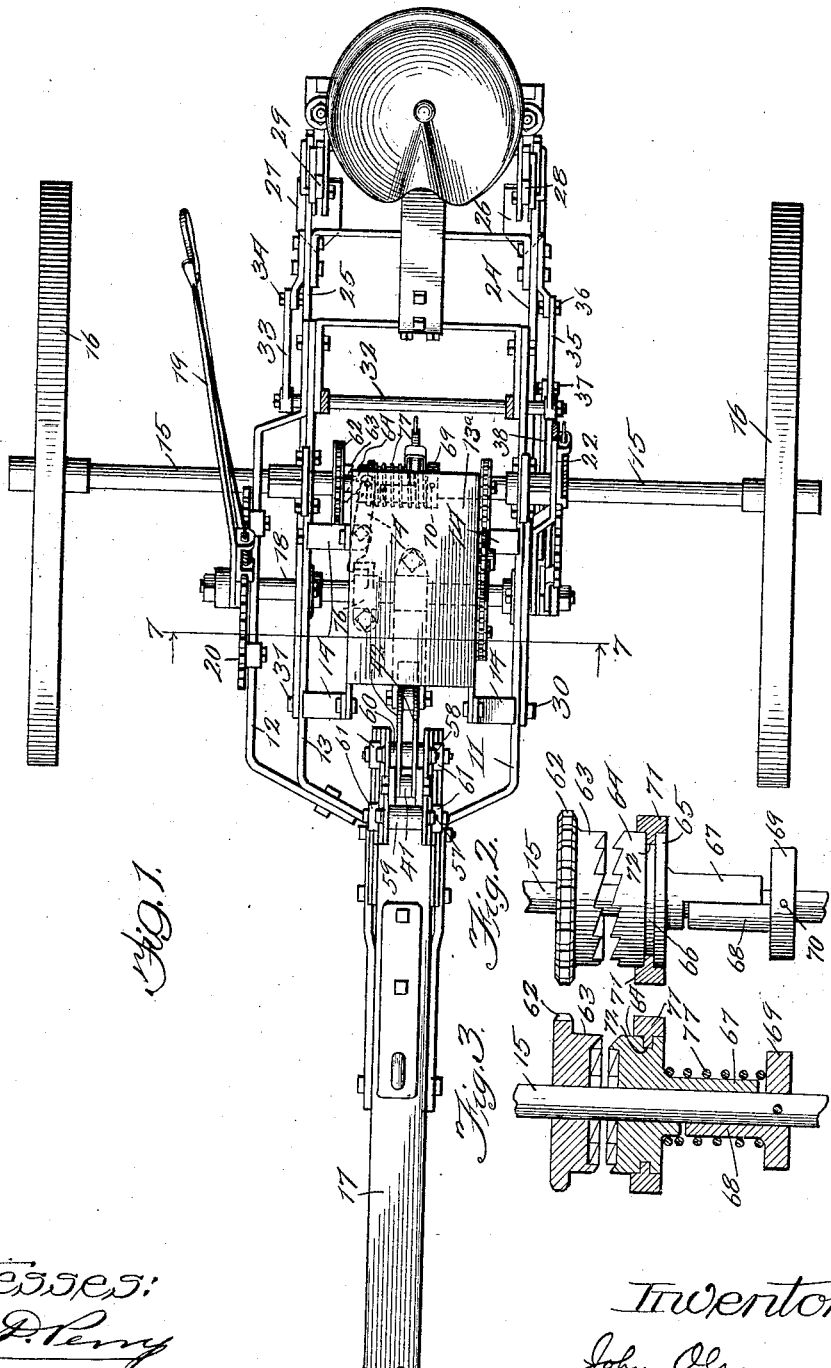

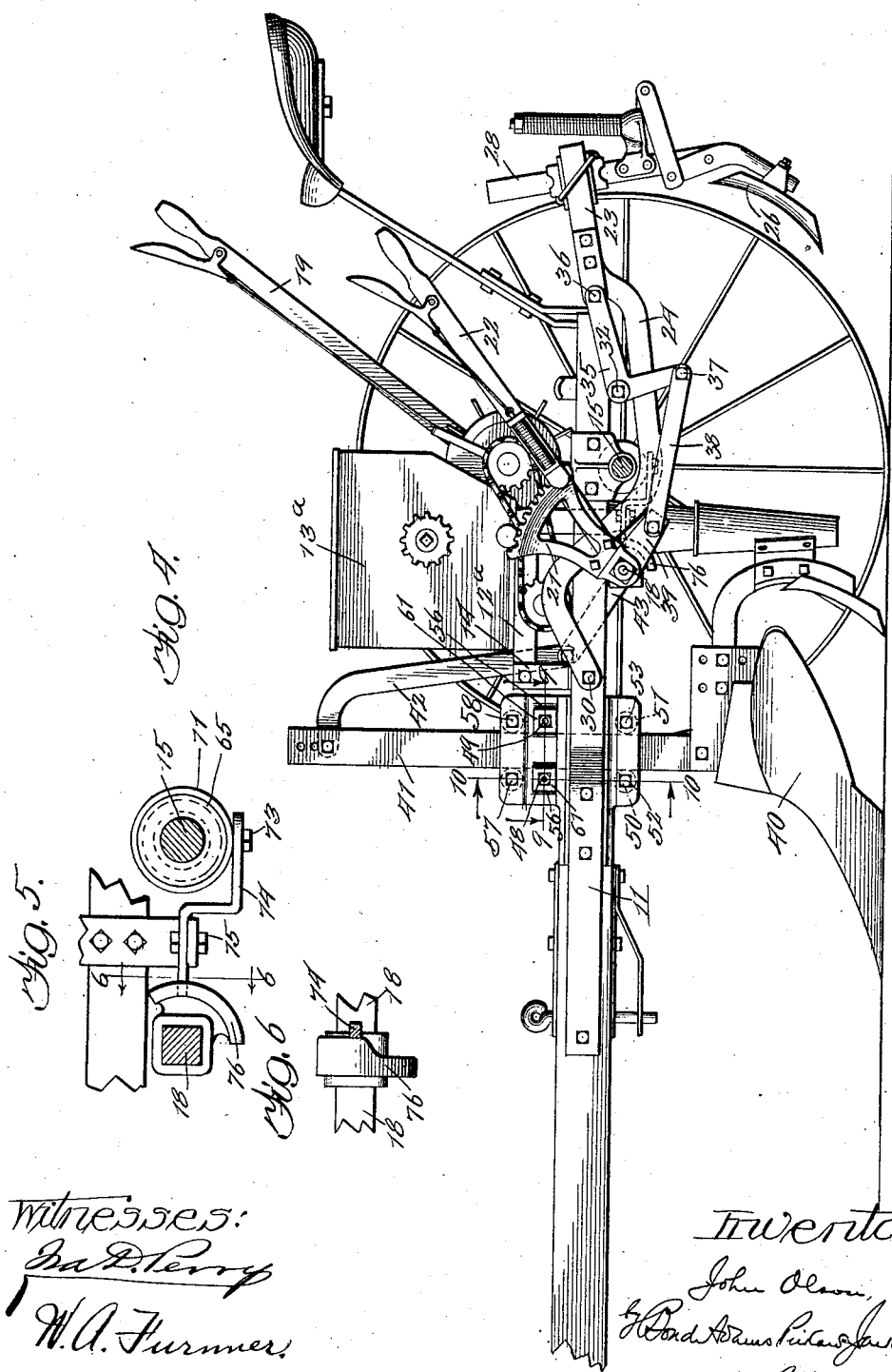

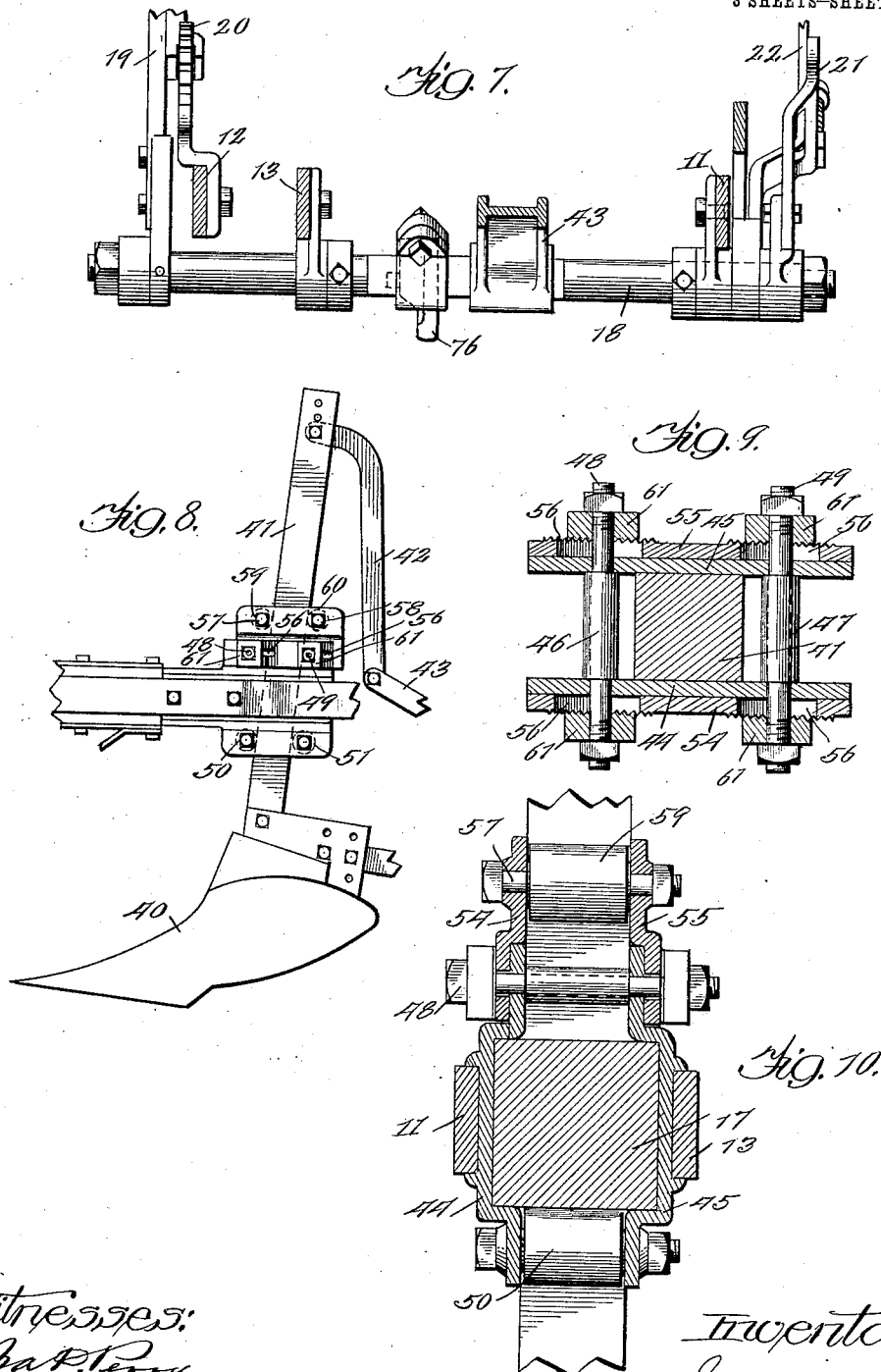

JOHN OLSON, OF BRADLEY, ILLINOIS, ASSIGNOR TO SEARS, ROEBUCK AND COMPANY, OF CHICAGO, ILLINOIS, A CORPORATION OF NEW YORK.

AGRICULTURAL IMPLEMENT.

1,062,602.  Specification of Letters Patent.  Patented May 27, 1913.

Application filed July 14, 1911. Serial No. 638,512.

*To all whom it may concern:*

Be it known that I, JOHN OLSON, a citizen of the United States, residing at Bradley, in the county of Kankakee and State of Illinois, have invented certain new and useful Improvements in Agricultural Implements, of which the following is a specification, reference being had to the accompanying drawings.

My invention relates to agricultural implements, and has more particularly to do with corn and cotton planters.

It has for its object to provide improved means for vertically adjusting the front furrow-opener and varying the pitch thereof so as to regulate the suction of the plow; also to provide means for automatically raising and lowering the rear shovels when the front furrow-opener is moved vertically, and to provide means by which said covering shovels may be independently moved vertically. I accomplish this object as illustrated in the drawings and as hereinafter described.

That which I regard as new is set forth in the claims.

In the accompanying drawings, Figure 1 is a plan view of my improved implement; Fig. 2 is a detail, being a plan view of the clutch mechanism by which the seed-dropping devices are operated, some parts being in section; Fig. 3 is a horizontal section of the parts shown in Fig. 2; Fig. 4 is a side elevation of my improved implement, one wheel being removed; Fig. 5 is an enlarged detail illustrating the mechanism by which the clutch mechanism is automatically operated to connect or disconnect the same when the front furrow-opener is lowered or raised; Fig. 6 is a section on line 6—6 of Fig. 5; Fig. 7 is a cross-section on line 7—7 of Fig. 1; Fig. 8 is a partial side elevation illustrating a different position of the front furrow-opener; Fig. 9 is an enlarged horizontal section on line 9—9 of Fig. 4; and Fig. 10 is an enlarged vertical section on line 10—10 of Fig. 4.

Referring to the drawings, 11—12—13 indicate members which form the frame of the machine, 12ᵃ indicating a supplemental frame with carries the seed-box 13ᵃ and is supported in the members 11—12 by brackets 14.

15 indicates the axle, 16 the wheels, and 17 the tongue which is secured to the main frame.

18 indicates a shaft, which is pivotally supported by the frame and extends transversely thereof in advance of the axle 15, as shown in Fig. 1.

19 indicates a lever, which is fixedly mounted upon the shaft 18, near one end thereof, so that by operating said lever the shaft 18 may be rocked.

20 indicates a segmental rack secured to the member 12 of the frame for locking the lever 19 in different positions of adjustment. 21 indicates a second segmental rack, which is mounted upon the shaft 18, preferably near the opposite end thereof, and is secured thereto so as to rock therewith.

22 indicates a second lever, which is loosely mounted on the shaft 18 adjacent to the rack 21, said lever being provided with the usual spring-dog for locking the lever 22 to the rack 21. Obviously, when the lever 22 and rack 21 are locked together the lever 22 rocks with the shaft 18. By releasing said lever from the rack 21, it may be operated independently of the shaft 18.

23 indicates a rear frame, which is mounted at the rear of the main frame upon swinging links 24—25 and carries covering shovels 26—27 secured to said frame by standards 28—29, as shown in Figs. 1 and 4. The links 24—25 are pivotally connected at their forward ends with the main frame by pivots 30—31 so that they may swing in vertical planes and raise or lower the rear frame 23 and the covering shovels 26—27 carried thereby.

32 indicates a shaft, which is mounted at the rear portion of the main frame and carries at one end an arm 33 pivotally connected with the frame 23 by a pivot 34, as shown in Fig. 1. At its opposite end the shaft 32 carries a bell-crank lever 35, one arm of which is connected by a pivot 36 with the rear frame 23, its other arm being connected by a pivot 37 and link 38 with an arm 39 carried by and rigid with the lever 22. By this arrangement by moving the lever 22 forward the arm 39 may be rocked to carry forward the link 38 and thereby rock the shaft 32 through the bell-crank lever 35 in such manner as to swing the rear frame 23 downward and lower the covering shovels 26—27. Rearward movement of the lever 22 operates to raise the covering shovels. These shovels may be similarly adjusted by leaving the lever 22 in locking engagement with the rack 21 and operating the lever 19, in which case the shaft 18 is rocked and the segmental rack 21 and lever 22 swing with it.

40 indicates the front furrow-opener or plow, which is carried at the lower end of an upright standard 41, as best shown in Figs. 4 and 8. The standard 41 is adjustably connected at or near its upper end with a link 42 the lower end of which is connected to a forwardly-projecting arm 43 which is fixed to the shaft 18, as shown in Figs. 4 and 7. Thus, by rocking the shaft 18, the link 42 and standard 41 may be moved vertically, and, as hereinbefore explained, such movement of the shaft 18 simultaneously raises or lowers the covering shovels 26—27,—the movement of the covering shovels corresponding with the movement of the plow 40. In order to guide the standard 41 when so adjusted vertically and also to determine the pitch of the plow, I provide upper and lower pairs of rollers between which the standard 41 moves, one of said pairs of rollers being adjustable longitudinally of the machine so as to cause the standard 41 to move either in a vertical plane or in a plane inclined to the vertical. The construction of the guiding mechanism is best shown in Figs. 4, 8, 9 and 10. As shown in Fig. 10, side-plates 44—45 are provided which are secured at opposite sides of the tongue 17, the front ends of the members 11—13 of the frame overlying said plates, as shown, so as to hold them firmly in position. The upper and lower ends of the plates 44—45 are spaced apart by sleeves 46—47 and are secured together by bolts 48—49, best shown in Figs. 9 and 10.

50—51 indicate rollers, which are mounted between the lower ends of the plates 44—45 upon bolts 52—53, as best shown in Figs. 4 and 10. Said rollers are spaced apart a distance equal to the width of the standard 41 so that they bear against the front and rear faces of said standard, as best shown in Figs. 4 and 8. These rollers are fixed in position.

54—55 indicate adjustable plates, which are provided with slots 56 to receive the ends of the bolts 48—49, as shown in Fig. 9, said plates being fitted against the sides of the upper portions of the plates 44—45 and projecting above the latter plates, as best shown in Fig. 10. The plates 54—55 are provided with bolts 57—58 which carry rollers 59—60 corresponding with the rollers 50—51. It will be noted that by reason of the slots 56 in the plates 54—55 said plates may be adjusted longitudinally of the machine, but they are normally held in fixed relation to the plates 44—45 by serrated nuts 61 which engage serrations on the outer faces of the plates 44—45, as shown in Fig. 9. By this construction the rollers 59—60 may be arranged in the same vertical plane as the rollers 50—51, as shown in Fig. 4, or they may be set over to one side thereof, as shown in Fig. 8. In the former case the standard 41 will be caused to move in a vertical plane, whereas with the latter arrangement the standard 41 will be held in an inclined position, as shown in Fig. 8. By this means, therefore, the pitch of the plow 40 and the suction thereof may be adjusted as desired. The sleeves 46—47 are set far enough apart so that they do not interfere with the adjustment of the plow standard.

The seed-box or hopper 13$^a$ is provided with suitable seed-dropping mechanism operated from the axle 15. The construction of such seed-dropping mechanism forms no part of my present invention, but my invention includes means for automatically disconnecting the seed-dropping mechanism from the axle when the plow is raised out of operative position. As shown in Figs. 1, 2 and 3, the axle 15 carries a sprocket-wheel 62 which is loosely mounted thereon and is provided with a clutch-member 63. Said clutch-member is adapted to coöperate with a clutch-member 64 carried by a sleeve 65 having a peripheral groove 66 and clutch-member 67, as shown in Fig. 2. The sleeve 65 is loosely mounted on the axle 15, but the clutch-member 67 is in engagement with a clutch-member 68 carried by a sleeve 69 which is fixedly secured upon the axle 15 by a pin 70. By this construction the sleeve 65 may be moved toward and from the clutch-member 63 without being disconnected from the axle 15.

71 indicates a collar fitted on the sleeve 65 and having a flange 72 which projects into the groove 66. The collar 71 is connected by a pin 73 with a lever 74 which is pivotally mounted between its ends upon the frame of the machine by a pivot 75, as shown in Fig. 5,—said lever extending forward from its pivot to a point adjacent to the shaft 18.

76 indicates a cam non-rotatably mounted on the shaft 18 and adapted to engage the forward end of the lever 74, the arrangement being such that when the shaft 18 is rocked to raise the plow 40, as hereinbefore described the cam 76 operates the lever 74 to move the sleeve 65 away from the sprocket-wheel 62 and thereby disengage the clutch-members 63—64. The seed-dropping mechanism is driven from the sprocket-wheel 62 in any convenient way, and consequently the disengagement of the clutch members 63—64 stops the seed-dropping mechanism. It will be noted that inasmuch as the disconnection of the seed-dropping mechanism from the axle 15 is effected by the rocking of the shaft 18 the covering shovels may be raised and lowered by means of the lever 22 without stopping the seed-dropping mechanism, as such operation does not rock the shaft 18. The clutch members 63—64 are normally held in operative engagement by a spring 77, best shown in Figs. 1 and 3.

While I have described with considerable particularity the embodiment of my invention illustrated in the accompanying drawings, I wish it to be understood that my invention is not restricted to the specific construction shown, and the claims hereinafter made are therefore to be construed accordingly.

That which I claim as my invention, and desire to secure by Letters Patent, is,—

1. In an agricultural implement, the combination of a frame, a furrow-opener having an upright standard, a lever, means actuated by said lever for moving said standard vertically, and guiding members for said standard, one of said guiding members being adjustable independently of the other to vary the inclination of said standard.

2. In an agricultural implement, the combination of a frame, a furrow-opener having an upright standard, a lever, means actuated by said lever for moving said standard vertically, and guiding means for said standard comprising upper and lower guiding members, one of said members being adjustable longitudinally of the machine to vary the inclination of the standard.

3. In an agricultural implement, the combination of a frame, a furrow-opener having an upright standard, a lever, means actuated by said lever for moving said standard vertically, and guiding means for said standard comprising upper and lower pairs of rollers between which said standard moves, one of said pairs of rollers being adjustable longitudinally of the machine to vary the inclination of the standard.

4. An agricultural implement comprising a frame, a transverse shaft mounted on said frame, a lever fixedly connected with said shaft for rocking the same, a lever loosely mounted on said shaft, locking mechanism for non-rotatably connecting the latter lever with said shaft, a vertically swinging member pivotally connected with the frame and extending rearwardly from such pivot, a covering shovel carried by said swinging member, and a bellcrank lever pivoted between its ends upon the frame, one arm of said bellcrank lever being connected with said swinging member, its other arm being connected with said loosely mounted lever whereby said swinging member may be moved vertically by operating the latter lever.

5. An agricultural implement comprising a frame, a furrow opener, a transverse shaft mounted on said frame back of the furrow opener, a lever fixedly connected with said shaft for rocking the same, a lever loosely mounted on said shaft, locking mechanism for non-rotatably connecting the latter lever with said shaft, a vertically swinging member pivotally connected with the frame and extending rearwardly from such pivot, a covering shovel carried by said swinging member, means connecting said last-mentioned lever with said swinging member whereby said member may be swung vertically by operating the latter lever, an arm connected with said shaft and extending forward therefrom, said arm being adapted to be swung vertically when said shaft is rocked, and means connecting said arm with said furrow opener for moving the furrow opener vertically.

6. An agricultural implement comprising a frame, a furrow opener, a transverse shaft mounted on said frame back of the furrow opener, a lever fixedly connected with said shaft for rocking the same, a lever loosely mounted on said shaft, locking mechanism for non-rotatably connecting the latter lever with said shaft, a vertically swinging member pivotally connected with the frame and extending rearwardly from such pivot, a covering shovel carried by said swinging member, a bellcrank lever pivoted upon the frame and connected with said swinging member and with said last-mentioned lever whereby said swinging member may be moved vertically by operating the latter lever, an arm connected with said shaft and extending forward therefrom, said arm being adapted to be swung vertically when said shaft is rocked, and means connecting said arm with said furrow opener for moving the furrow opener vertically.

JOHN OLSON.

Witnesses:
W. R. BOND,
F. L. MARTIN.